United States Patent
Wilson et al.

(10) Patent No.: US 9,027,890 B2
(45) Date of Patent: May 12, 2015

(54) TRANSLATING CABLE DEVICE SEALING

(71) Applicant: Airbus Operations Limited, Bristol (GB)

(72) Inventors: James Wilson, Winscombe (GB); Paul Hadley, Weston-Super-Mare (GB); Alexandru Teodoru, Bristol (GB)

(73) Assignee: Airbus Operations Limited, Bristol (GB)

( * ) Notice: Subject to any disclaimer, the term of this patent is extended or adjusted under 35 U.S.C. 154(b) by 59 days.

(21) Appl. No.: 13/714,701

(22) Filed: Dec. 14, 2012

(65) Prior Publication Data
US 2013/0153713 A1 Jun. 20, 2013

(30) Foreign Application Priority Data

Dec. 14, 2011 (GB) .................................. 1121447.5

(51) Int. Cl.
*B64C 13/30* (2006.01)
*B64C 9/22* (2006.01)
*B64D 15/12* (2006.01)

(52) U.S. Cl.
CPC . *B64C 13/30* (2013.01); *B64C 9/22* (2013.01); *B64D 15/12* (2013.01); *Y02T 50/44* (2013.01); *Y02T 50/32* (2013.01)

(58) Field of Classification Search
CPC .............. B64C 1/06; B64C 3/50; B64C 9/22; B64C 9/24; B64C 9/26; B64C 13/00; B64C 13/26
USPC .......................... 244/99.2, 99.3, 131, 213, 214
See application file for complete search history.

(56) References Cited

U.S. PATENT DOCUMENTS

| | | | |
|---|---|---|---|
| 6,164,660 A * | 12/2000 | Goodman | 277/556 |
| 7,677,499 B2 | 3/2010 | Weaver | |
| 2002/0005462 A1 | 1/2002 | Broadbent | |
| 2009/0078084 A1* | 3/2009 | Compau | 74/608 |
| 2010/0327111 A1 | 12/2010 | Sanderson | |
| 2011/0024566 A1* | 2/2011 | Soenarjo | 244/131 |
| 2011/0100679 A1 | 5/2011 | Biggadike | |
| 2013/0233967 A1* | 9/2013 | Salthouse et al. | 244/99.3 |

FOREIGN PATENT DOCUMENTS

| | | |
|---|---|---|
| GB | 1572004 | 7/1980 |
| GB | 2311969 A | 10/1997 |
| WO | 2006027624 A1 | 3/2006 |
| WO | 2009130473 A1 | 10/2009 |

OTHER PUBLICATIONS

Search Report corresponding to GB 1121447.5, dated Apr. 13, 2012.

* cited by examiner

*Primary Examiner* — Philip J Bonzell
*Assistant Examiner* — Christopher Hutchens
(74) *Attorney, Agent, or Firm* — Lowe Hauptman & Ham, LLP

(57) ABSTRACT

An aircraft wing assembly, comprising a wing having a fixed leading edge, a slat mounted for movement between a retracted position and an extended position with respect to the fixed leading edge, and a translating cable device for electrically connecting the slat to the wing and having a strut coupled at one end to the slat, the fixed leading edge having an aperture to accommodate the strut, and a seal assembly for sealing between the strut and the aperture.

16 Claims, 5 Drawing Sheets

TRANSLATING CABLE DEVICE SEALING

RELATED APPLICATIONS

The present application is based on, and claims priority from, British Application Number 1121447.5, filed Dec. 14, 2011, the disclosure of which is hereby incorporated by reference herein in its entirety.

FIELD OF THE INVENTION

The present invention relates to an aircraft wing assembly having a leading edge slat, and in particular to a translating cable device for electrically connecting the slat to the wing.

BACKGROUND OF THE INVENTION

Ice protection of aircraft leading edge structures has traditionally been provided on larger commercial fixed wing aircraft through the use of bleed air. More recently, there has been a move to incorporate electrical de-icing systems because of their greater efficiency. The areas of commercial fixed wing aircraft that have particular need for ice protection are the movable leading edge slat structures.

WO2006/027624A describes a coupling arrangement for coupling services between an aircraft wing fixed aerofoil component and a extendable leading edge slat mounted thereto. The coupling arrangement includes a housing for connection to the fixed aerofoil structure, and a hollow telescopic assembly extendable between a retracted and an extended position. A service carrying conduit arrangement carries the services, such as electrical power cables, between the fixed aerofoil component and the leading edge slat, and extends through the hollow telescopic assembly. The service carrying conduit arrangement is flexible and excess thereof is located within the housing when the telescopic assembly is in the retracted position. The telescopic assembly is coupled at one end to the slat, and therefore translates with respect to the fixed aerofoil component as the slat moves. The fixed aerofoil component has an aperture to accommodate the telescopic assembly. The aperture is elongate to permit rotation of the telescopic assembly in a vertical plane as the slat moves.

The aperture in the fixed leading edge structure is covered by the slat when the slat is retracted but faces the oncoming airflow when the slat is deployed for the high-lift (take-off and landing) configurations. The aperture causes aerodynamic drag and undesirable flow disturbances over the wing in the high-lift configurations.

SUMMARY OF THE INVENTION

The invention provides an aircraft wing assembly, comprising a wing having a fixed leading edge, a slat mounted for movement between a retracted position and an extended position with respect to the fixed leading edge, and a translating cable device for electrically connecting the slat to the wing and having a strut coupled at one end to the slat, the fixed leading edge having an aperture to accommodate the strut, and a seal assembly for sealing between the strut and the aperture.

The seal assembly may include a first seal fixed adjacent the aperture, and a second seal fixed to the strut of the translating cable device.

The first and second seals preferably cooperate when the slat is moved to one or more predetermined positions. A plurality of second seals may be provided, each cooperating with the first seal at a respective different slat position.

The translating cable device may have a proximal end mounted to the wing and a distal end coupled to the slat.

The seal assembly may include a flap seal (a first seal) mounted to the fixed leading edge and projecting into the aperture.

The flap seal may include a plurality of flap seal sections with a gap between adjacent sections.

The flap seal may be mounted to a portion of the fixed leading edge substantially surrounding the aperture.

The flap seal may include a first portion mounted to an interior surface of a panel defining the fixed leading edge adjacent an edge of the aperture, and a second portion within the aperture and substantially conformal with an outer surface of the panel.

The flap seal may have a central cut-out.

The translating cable device may include either an articulating mechanism (such as described in WO2009/130473A), or a telescoping mechanism (such as described in US2010/0327111A).

The articulating mechanism may include a first strut pivotally mounted to the wing, and a second strut having a proximal end pivotally connected to the first strut and a distal end coupled to the slat.

The second strut may be curved.

The seal assembly may include a plug seal (a second seal) fixed to the strut at a location remote from the end of the strut which is coupled to the slat.

The plug seal may be arranged to enter the aperture in the fixed leading edge when the slat is fully extended, and to withdraw from the aperture into the wing when the slat is retracted.

The seal assembly may include a seal boot (a second seal) covering the coupling between the translating cable device and the slat. As well as coopering with a first seal of the seal assembly (such as the flap seal), the seal boot may act as a protective covering to prevent damage to the first seal from protruding elements, such as bolts, for example, of the coupling as it moves through the aperture.

The translating cable device may be passively driven by movement of the slat.

The aircraft wing assembly may further comprise a slat actuation mechanism for driving the slat between its extended and retracted positions.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
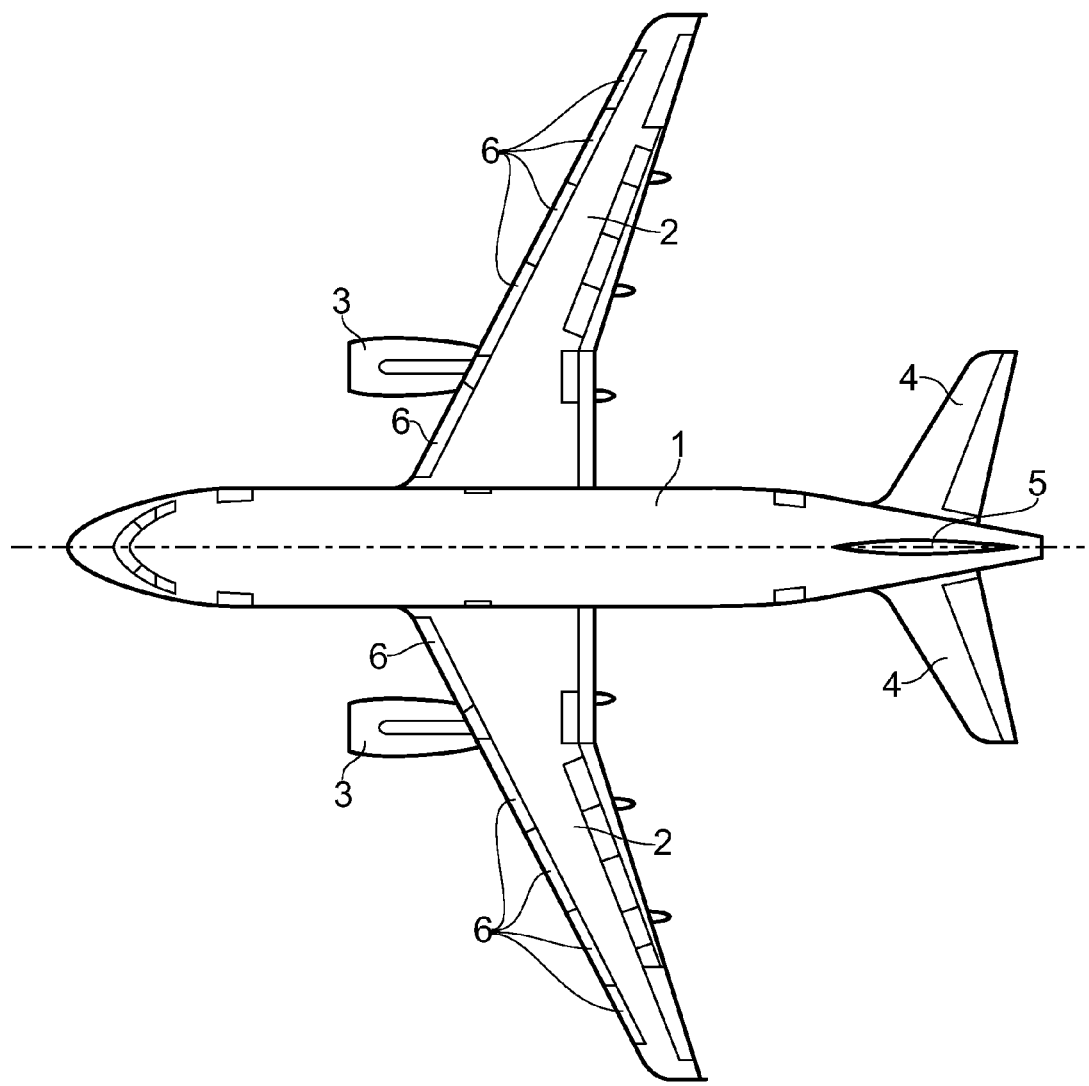
FIG. 1 illustrates a plan view of a fixed wing commercial aircraft having leading edge slats.

FIG. 1 illustrates a fixed wing commercial aircraft of conventional type having a fuselage 1, wings 2, under-wing mounted engines 3, and horizontal and vertical stabiliser surfaces 4, 5 respectively. However, this invention is not limited to a particular type of aircraft, or aircraft configuration, except insofar as the wings 2 have movable leading edge slats 6.

Accordingly, this invention is applicable to a wide variety of commercial and military aircraft, having a variety of different power plants (e.g. jet, turbo-prop, etc.) mounted in a variety of locations (e.g. fuselage, tail, over-wing, underwing), wing configurations (e.g. high wing, low wing, blended wing body, etc.), wing planforms (e.g. forward swept, unswept, aft swept, etc.), and a variety of stabiliser surfaces including tail planes, canards etc.

Figure 2:
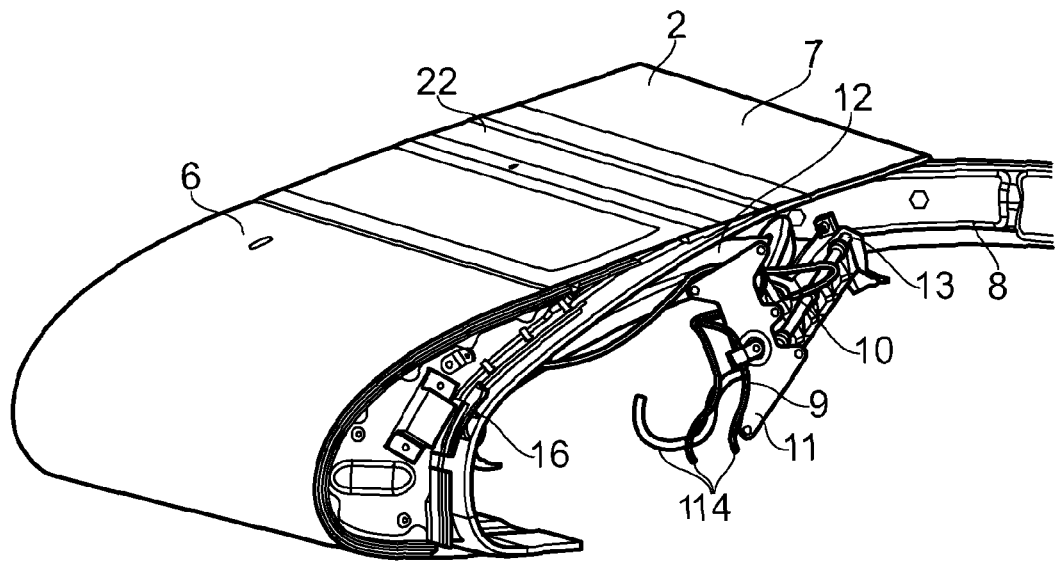
FIG. 2 illustrates a partially cut-away view of the wing leading edge region showing the fixed leading edge of the wing, the slat (retracted), and an articulated translating cable device electrically connecting the slat to the wing.

FIG. 2 illustrates a partially cut-away view of the wing leading edge region showing the wing 2 having a fixed leading edge 7 and one of the slats 6 fully retracted and stowed against the fixed leading edge 7. The slat is movable between a retracted position and a plurality of extended positions (including a take off position, and a landing position) by a slat actuation mechanism. In this embodiment, the slat actuation mechanism includes a slat track 8 of conventional type. A detailed discussion of the slat track and other components of the slat actuation mechanism will therefore not be repeated here. Of course, it will be appreciated that the slat may be moved by a variety of different slat actuation mechanisms, and this invention is not limited to any particular type of slat actuation mechanism. The slat 6 is translationally movable with respect to the fixed leading edge 7.

Also shown in FIG. 2 is a translating cable device 9 for electrically connecting the slat 6 to the wing 2. The translating cable device 9 is of an articulating type and includes a first strut 10 pivotally mounted to the fixed wing structure (e.g. a rib—not shown) by bracket 11, and a second strut 12 having a proximal end 13 pivotally connected to the first strut 10 and a distal end 14 (shown in FIG. 5) coupled to the slat 6 by a coupling 21, e.g. a revolute joint.

The translating cable device 9 is passively driven by movement of the slat 6. The second strut 12 has a hollow tubular construction which carries a cable (which may be a cable bundle, a single cable, or a plurality of individual cables). The cable is coupled to a cable connector (not shown) mounted on rear of the slat 6 and is routed through the hollow tubular second strut 12, around the pivot joint connecting the first and second struts 10, 12, and is coupled at its other ends to wiring routes (not shown) within the wing leading edge structure. In the assembly view of FIG. 2, the (unconnected) cable ends 114 on the wing side are visible.

Routing of the cables through the articulating translating cable device 9 may be by means of a cable router such as described in WO2009/130473, the contents of which is incorporated herein by reference. The cable router includes a cable protector adjacent the pivot axis so as to constrain the cable adjacent the pivot and to key the movement of the cable with the respective adjacent struts 10, 12 of the articulating mechanism 9. This helps minimise the relative movement between the cable protector and the cable as the mechanism pivots, and thus reduces fretting of the cable.

As the slat 6 moves between its extended and retracted positions with respect to the wing fixed leading edge 7 the second strut 12, which is coupled to the slat 6, moves causing articulation of the translating cable device 9.

Figure 3:
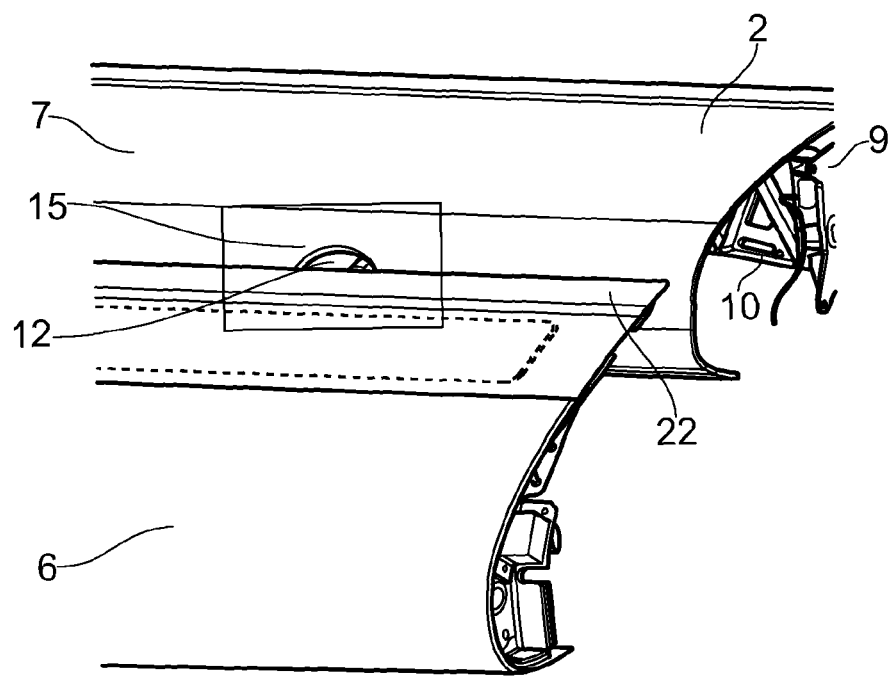
FIG. 3 illustrates a partially cut-away view of the wing leading edge region showing the slat (extended) to reveal the aperture in the fixed leading edge which accommodates the strut of the translating cable device that is coupled to the slat, and showing the area to be sealed.

As can be seen from FIG. 3, the fixed leading edge has an aperture 15 to accommodate the strut 12. When the slat 6 is retracted, as shown in FIG. 2, this aperture 15 is covered by the slat 6 and is not exposed to the airflow over the wing. The slat 6 has a high speed bulb seal 16 for sealing between the slat 6 and the fixed leading edge 7 when the aircraft is in the high speed cruise condition. The bulb seal 16 is disposed just above an upper edge of the aperture 15 in the sealed condition. The high speed seal 16 therefore prevents leakage air passing from high pressure regions to low pressure regions around the wing. When the slat 6 is deployed to its landing position (slat 6 fully extended), as shown in FIG. 3, the aperture 15 becomes exposed to the airflow over the wing and, if not sealed, would contribute to aerodynamic drag, noise and undesirable flow disturbances over the upper surface of the wing.

To seal the aperture 15, a seal assembly is provided which includes a plurality of discrete seal elements, which will now be described in detail.

Figure 4:
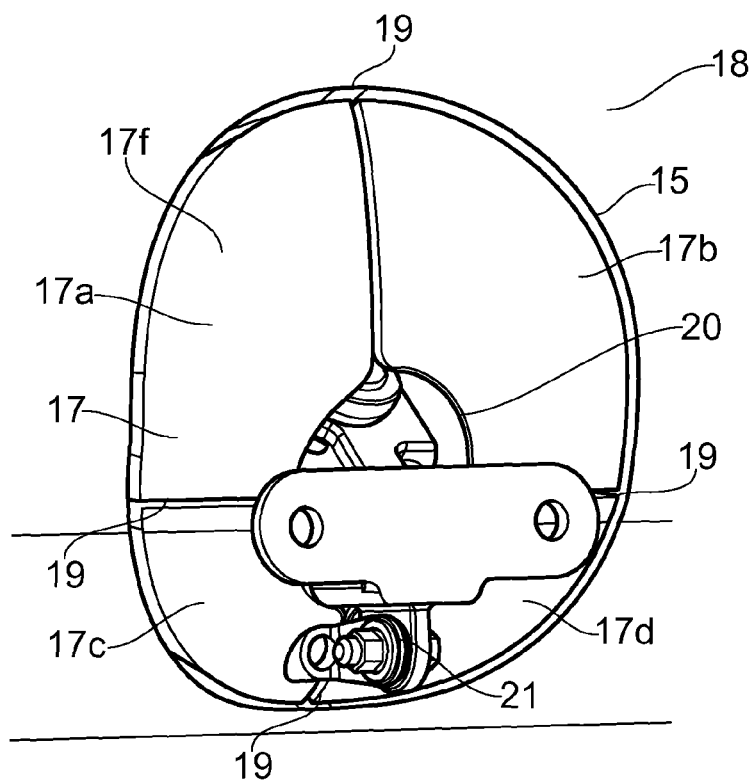
FIG. 4 illustrates a view of the aperture in the fixed leading edge looking aft with the slat removed to show the coupling at the end of the strut (slat retracted), and the flap seal in four sections projecting into the aperture.

FIG. 4 illustrates a flap seal 17 (a "first seal") fixed adjacent the aperture 15. The flap seal 17 includes a plurality of flap seal portions and in the embodiment depicted in FIGS. 4 and 5 the flap seal 17 includes four flap seal portions including two upper flap seal portions 17a, 17b and two lower flap seal portions 17c and 17d. The flap seal portions 17a-d are discrete seal elements individually fastened to the interior surface of a D-nose panel 18 defining the fixed leading edge profile. The flap seal portions 17a-d are arranged so as to provide a clearance gap 19 between each adjacent flap seal section 17a-d.

The flap seal 17 has a stepped configuration including a mounting portion 17e surrounding substantially the entire circumference of the generally elliptical aperture 15 (save for the gaps 19) and which mounting portion 17e is fastened to the reverse face of the D-nose panel 18. The flap seal 17 further includes a free portion 17f projecting into the aperture 15. The free portion 17f is arranged substantially flush with the outer surface of the D-nose panel 18. Finally, the flap seal 17 includes an intermediate portion 17g connecting the free portion 17f to the mounting portion 17e which traverses the wall thickness of the D-nose panel 18 around the circumferential edge of the aperture 15.

The free portion 17f of the flap seal is configured to deflect as the strut 12 of the translating cable device 9 moves between its extended and refracted positions driven passively by movement of the slat 6. By providing the flap seal 17 as a plurality of discrete flap seal portions 17 a-d with gaps 19 between adjacent portions the free portion 17f of the flap seal is permitted greater freedom for deflecting as the strut 12 moves through the aperture 15. The flap seal portions 17 *a-d* are arranged to seal a respective quadrant of the generally elliptical aperture 15, although the upper seal sections 17 *a, b* are larger than the lower seal sections 17 *c, d*.

Figure 5:
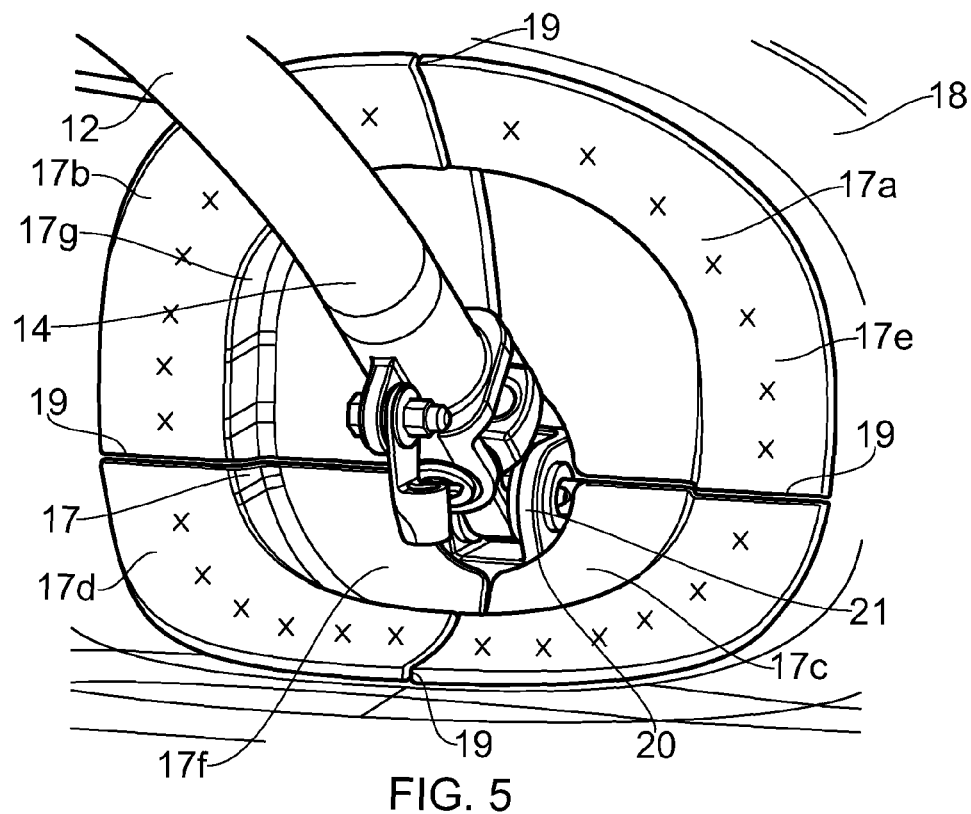
FIG. 5 illustrates a view of the aperture in the fixed leading edge looking forward to show the coupling at the end of the strut (slat retracted) protruding through the cut-out in the flap seal, and showing the mounting on the flap seal to the interior surface of the leading edge panel.

The flap seal 17 further defines a cut-out 20 located generally centrally within the flap seal 17. The cut-out 20 is sized larger than the outer diameter of the strut 12 but smaller than a maximum "diameter" of the coupling 21 used to connect the distal end 14 of the strut 12 to the slat 6. As shown in FIGS. 4 and 5, coupling 21 extends either side of the flap seal 17 when the slat 6 is retracted for the cruise condition.

When slat 6 is moved to its partially extended take off position, the slat trailing edge 22 remains in contact with the outer surface of the D-nose panel 18 defining the fixed leading edge 7. The flap seal 17 is therefore not exposed to the oncoming airflow over the wing surface. However, the flap seal 17 is exposed to the cove region behind the partially extended slat 6 and so the flap seal 17 is required to provide adequate sealing to prevent excessive airflow through the aperture 15 which may result in a generally spanwise cross-flow through the inside of the wing immediately behind the fixed leading edge 7.

Figure 6:
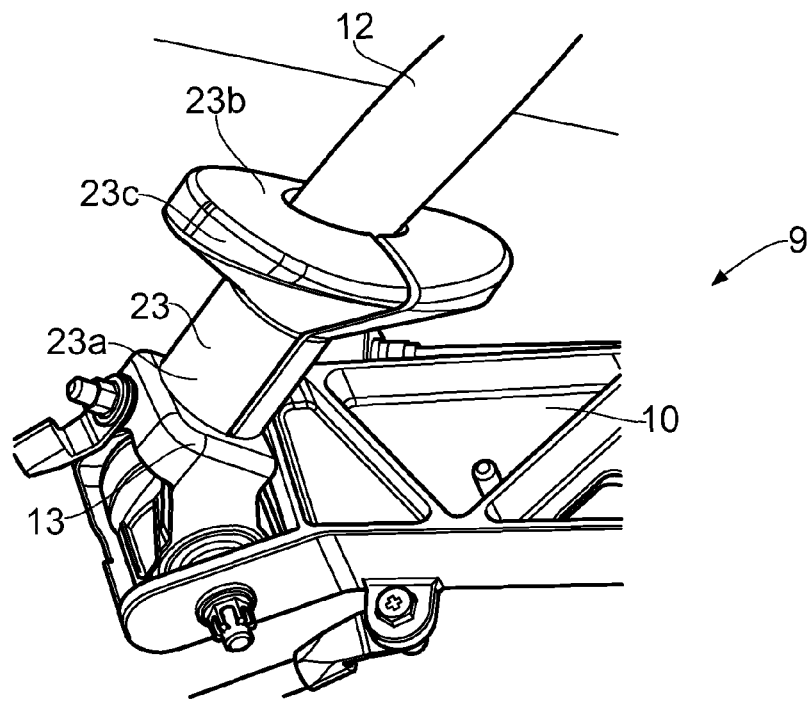
FIG. 6 illustrates a view of the articulated translating cable device (slat retracted) showing the plug seal (a second seal) of the seal assembly fixed to the end of the end of the strut opposite to that which is coupled to the slat.

When slat 6 is moved to its fully extended landing position, as shown in FIG. 3, the aperture 15 and therefore the flap seal 17 becomes exposed to the airflow over the wing and so the seal assembly includes a "second seal" fixed to the strut 12 of the translating cable device 9 such that the first and second seals cooperate to provide an enhanced sealing effect. The second seal is a plug seal 23, best shown in FIGS. 6 and 7.

The plug seal 23 is arranged to enter the aperture 15 in the D-nose panel 18 defining the fixed leading edge when the slat is fully extended (i.e. to its landing position), and to withdraw from the aperture 15 into the wing leading edge region behind the D-nose panel 18 when the slat is retracted. The plug seal 23 includes a mounting portion 23*a* formed generally as a sleeve for fixing to the tubular strut 12 at its proximal end 13. The plug seal 23 further comprises a generally elliptical sealing face 23*b* shaped to generally correspond with the shape of the elliptical aperture 15 but sized smaller than the edges of the aperture 15. The sealing face 23*b* is set at an oblique angle to the longitudinal axis of the strut 12 and is supported by a conical form 23*c* so as to blend into the sleeve section 23*a*. The plug seal 23 is generally rigid as compared with the flap seal 17. The plug seal 23 may be generally solid, or alternatively for weight saving the plug seal 23 may include internal voids.

Figure 7:
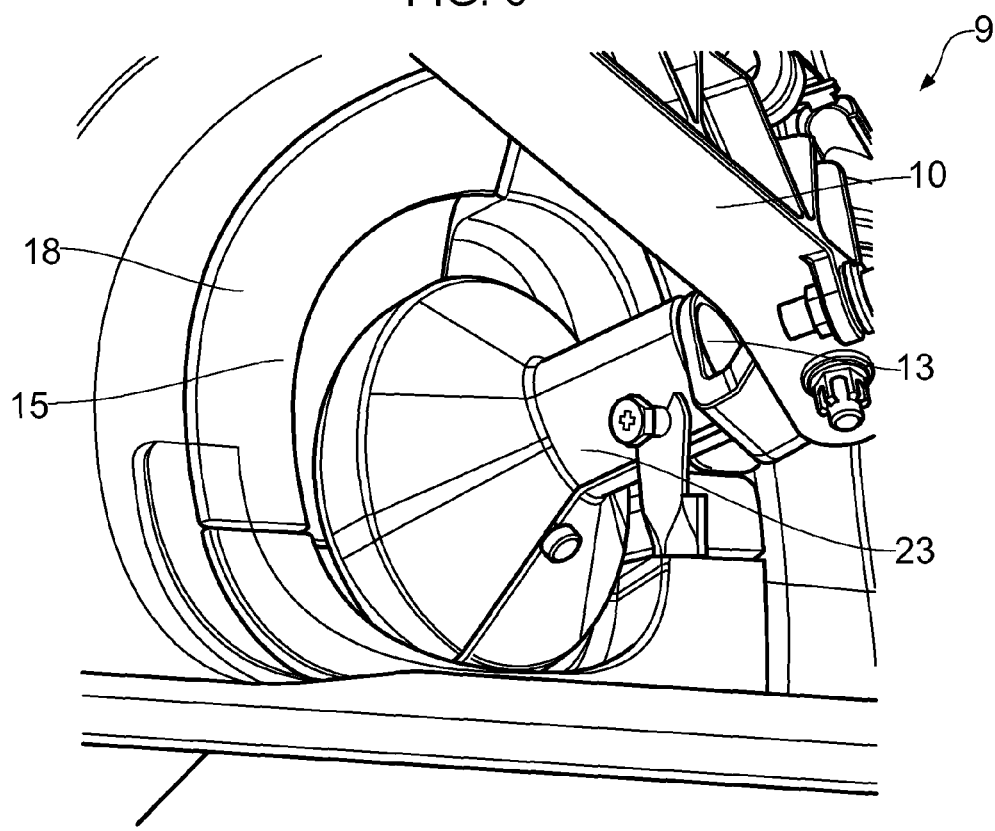
FIG. 7 illustrates a view of the articulated translating cable device (slat extended) showing the plug seal adjacent the aperture in the fixed leading edge where the plug seal cooperates with the flap seal (not shown for clarity) to seal the aperture.

As can best be seen from FIG. 7, when the slat 6 is moved to its fully extended (landing) position the translating cable device 9 becomes fully extended such that the plug seal 23 enters the aperture 15. It is to be noted that the flap seal 17 has been removed from around the aperture 15 in FIG. 7 for clarity. The sealing face 23*b* contacts the interior surface of the free portion 17*f* of the flap seal 17 so as to provide an improved sealing effect. In particular, the plug seal 23 has the effect of preventing any significant inward deflection of the flap seal quadrants 17*a-d* due to the oncoming airflow, to seal the gaps 19 between the flap seal quadrants 17*a-d*, and also to fill the cut-out 20 in the flap seal 17. In this way, the flap seal 17 and the plug seal 23 provide an excellent sealing effect so as to substantially aerodynamically seal the aperture 15 in the fixed leading edge 7 when the slat 6 is fully deployed to its landing position.

Returning to FIG. 5, it can be seen that when the slat 6 is fully retracted, the coupling 21 between the distal end 14 of the strut 12 and the slat 6 extends either side of the flap seal 17 and includes several relatively sharp projecting surfaces, such as exposed bolts etc. The seal assembly therefore includes a further seal element, in the form of a seal boot 24 shown in FIG. 8. The seal boot 24 is considered to be another "second seal" since, in addition to providing a protective cover over the coupling 21 for protecting the flap seal 17, the seal boot 24 is arranged to cooperate with the flap seal 17 so as to provide an improved sealing effect when the slat 6 is in its fully retracted (cruise) position. By substantially sealing the aperture 15 with the flap seal 17 and the seal boot 24 in the cruise configuration, it becomes possible to minimise spanwise airflow along the interior of the wing immediately behind the fixed leading edge 7.

As can be seen, the seal assembly includes a plurality of "second seals" (the plug seal 23 and the boot seal 24) each adapted to cooperate with the "first seal" (the flap seal 17) at respective different positions of the slat 6.

The seals may include various seal materials, and each of the seals may be constructed differently. The seals 17, 23, 24 are exposed to cold temperature environments. The flap seal 17 may be sufficiently flexible yet sufficiently abrasion resistant to accommodate movement of the strut. The boot seal 24 may also be flexible yet abrasion resistant. The plug seal 23 may be less flexible than the flap seal 17.

Suitable seal materials for the flap seal 17 may include, for example, a reinforced silicone rubber or other elastomer. A fluoro-silicone material may be preferable. The reinforcement may include a fabric, such as a woven or knitted fibre layer. The fibres may be of polyester, cotton or any other suitable material. The outer surface of the flap seal 17 may include an environmental protection layer, such as a polyurethane coating. The flap seal 17 may be moulded or otherwise formed. Similar materials may also be used for the seal boot 23.

The plug seal 24 may be stiffer than the flap seal 17. The plug seal 24 is also exposed to cold temperature environments, but generally has lower abrasion and flexibility requirements than the flap seal 17. The plug seal 24 may therefore be constructed of a variety of materials, such as a phenolic resin with a woven fabric (e.g. Tufnol), a soft elastomer, an aluminum composite, or a combination of these.

Depending on the location of the various seals to the aircraft engines, the seal materials may need to be fire retardant to a particular level.

Figure 8:
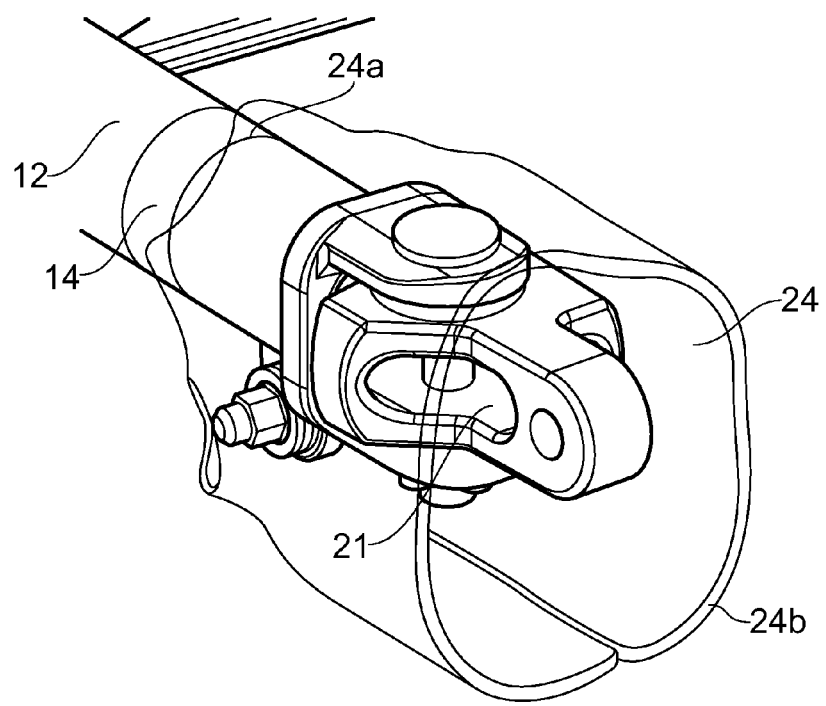
FIG. 8 illustrates a view of the coupling at the end of the strut of the translating cable device (slat removed for clarity) having a seal boot (another second seal) for cooperating with the flap seal when the slat is retracted and for protecting the flap seal from protruding edges of the coupling.

As shown in FIG. 8, the boot seal 24 encapsulates the coupling 21 and is formed generally as a sheath having a proximal end 24*a* wrapped around the distal end 14 of the strut 12, and a distal end 24*b* for sealing against the aft face of the slat 6. The seal boot 24 provides protection to the edges of the cut-out 20 in the flap seal 17 from protruding relatively sharp edges of the coupling 21. The boot seal 24 also occupies the cut-out 20 in the flap seal 17 when the slat 6 is fully retracted so as to provide an improved sealing effect when the slat 6 is fully retracted. In addition, the seal boot 24 provides a more aerodynamic surface around the coupling 21 so as to reduce aerodynamic drag and noise created when the distal end 14 of the strut 12 is projected into the airflow within the cove region immediately behind the slat 6 when the slat is partially or fully deployed for the take off or landing high lift configurations.

Figure 9:
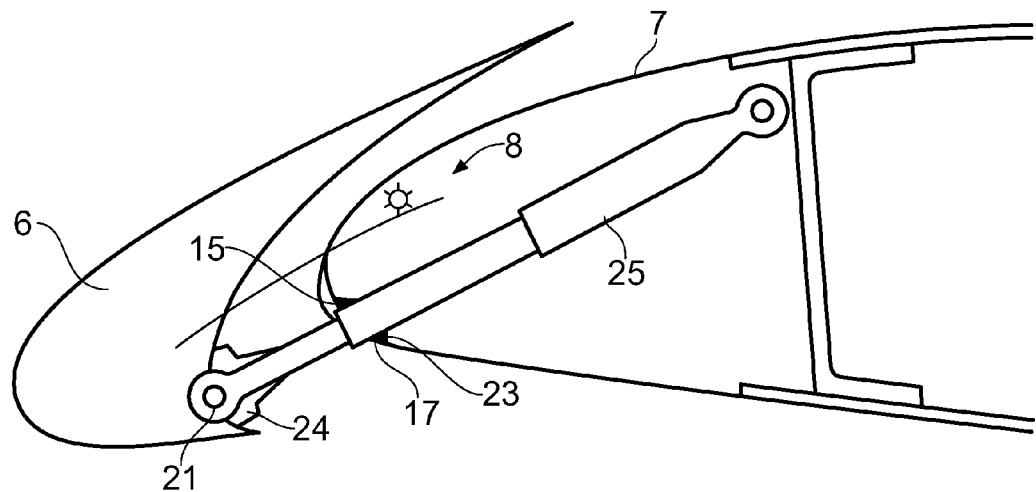
FIG. 9 illustrates a schematic view of an aircraft wing leading edge arrangement in accordance with another embodiment of the invention having a telescopic translating cable device, a flap seal (first seal) and a seal boot (second seal).

It will be appreciated that whilst in the above described embodiment the translating cable device is of the articulating type, other translating cable devices are known in the art such as the telescopic arrangement described in US2010/0327111A. FIG. 9 shows a telescopic translating cable device 25 arranged to provide a similar function of electrically connecting the slat 6 to the wing 2. The telescopic translating cable device includes a strut in three sections, which move telescopically as the slat 6 moves between its retracted and extended positions. As can be seen, the aircraft wing assembly shown in FIG. 9 also includes the flap seal 17 in the fixed leading edge 7, the plug seal 23 fixed to the outside of the strut, and the seal boot 24 around the coupling 21 between a distal end of the telescopic translating cable device 25 and the slat 6. The flap seal 17, the plug seal 23 and the seal boot 24 are arranged and function substantially identically to the embodiment described above. The plug seal 23 is fixed to the middle one of the three telescopic strut sections, adjacent a distal end thereof nearest the slat 6. Of course, the telescopic strut can have greater or fewer sections than three.

Although the invention has been described above with reference to one or more preferred embodiments, it will be appreciated that various changes or modifications may be made without departing from the scope of the invention as defined in the appended claims.

The invention claimed is:

1. An aircraft wing assembly, comprising a wing having a fixed leading edge, a slat mounted for movement between a retracted position and an extended position with respect to the fixed leading edge, and a translating cable device for electrically connecting the slat to the wing and having a strut coupled at one end to the slat, the fixed leading edge having an aperture to accommodate the strut, and a seal assembly for sealing between the strut and the aperture, wherein the seal assembly includes a first seal fixed within the aperture, and a second seal fixed to the strut of the translating cable device, and wherein the first and second seals contact when the slat is moved to one or more predetermined positions.

2. The aircraft wing assembly according to claim 1, wherein the translating cable device has a proximal end mounted to the wing and a distal end coupled to the slat.

3. The aircraft wing assembly according to claim 1, wherein the seal assembly includes a flap seal mounted to the fixed leading edge and projecting into the aperture.

4. The aircraft wing assembly according to claim 3, wherein the flap seal includes a plurality of flap seal sections with a gap between adjacent sections.

5. The aircraft wing assembly according to claim 3, wherein the flap seal is mounted to a portion of the fixed leading edge substantially surrounding the aperture.

6. The aircraft wing assembly according to claim 3, wherein the flap seal includes a first portion mounted to an interior surface of a panel defining the fixed leading edge adjacent an edge of the aperture, and a second portion within the aperture and substantially conformal with an outer surface of the panel.

7. The aircraft wing assembly according to claim 3, wherein the flap seal has a central cut-out.

8. The aircraft wing assembly according to claim 1, wherein the translating cable device includes either an articulating mechanism, or a telescoping mechanism.

9. The aircraft wing assembly according to claim 8, wherein the articulating mechanism includes the strut coupled at a distal end to the slat and pivotally connected at a proximal end to a further strut, the further strut being pivotally mounted to the wing.

10. The aircraft wing assembly according to claim 9, wherein the strut is curved.

11. The aircraft wing assembly according to claim 1 wherein the seal assembly includes a plug seal fixed to the strut at a location remote from the end of the strut which is coupled to the slat.

12. The aircraft wing assembly according to claim 11, wherein the plug seal is arranged to enter the aperture in the fixed leading edge when the slat is fully extended, and to withdraw from the aperture into the wing when the slat is retracted.

13. The aircraft wing assembly according to claim 1 wherein the seal assembly includes a seal boot covering the coupling between the translating cable device and the slat.

14. The aircraft wing assembly according to claim 1, wherein the translating cable device is passively driven by movement of the slat.

15. The aircraft wing assembly according to claim 1, further comprising a slat actuation mechanism for driving the slat between its extended and retracted positions.

16. An aircraft wing assembly, comprising a wing having a fixed leading edge, a slat mounted for movement between a refracted position and an extended position with respect to the fixed leading edge, and a translating cable device for electrically connecting the slat to the wing and having a strut coupled at one end to the slat, the fixed leading edge having an aperture to accommodate the strut, and a seal assembly for sealing between the strut and the aperture wherein the seal assembly includes a first seal fixed within the aperture, and a second seal fixed to the strut of the translating cable device, such that when the slat is moved to the extended position the first and second seals contact to substantially aerodynamically seal the aperture.

* * * * *